United States Patent [19]

Mizokami

[11] 4,456,353

[45] Jun. 26, 1984

[54] PHOTOMETRY CONTROLLER FOR CAMERA HAVING AN ELECTRONIC FLASH CONTROLLING CAPABILITY AND CAPABLE OF PHOTOMETRY OF REFLECTION FROM FILM SURFACE

[75] Inventor: Kazunori Mizokami, Hachioji, Japan

[73] Assignee: Olympus Optical Co., Ltd., Tokyo, Japan

[21] Appl. No.: 423,700

[22] Filed: Sep. 27, 1982

[30] Foreign Application Priority Data

Dec. 11, 1981 [JP] Japan .................. 56-200379

[51] Int. Cl.³ .............. G03B 7/093; G03B 7/099; G03B 15/05
[52] U.S. Cl. .................. 354/414; 354/456; 354/431
[58] Field of Search ......... 354/23 D, 24, 31, 32, 354/33, 34, 51

[56] References Cited

U.S. PATENT DOCUMENTS 4,402,587  9/1983  Yamasaki .............. 354/31

Primary Examiner—Michael L. Gellner
Attorney, Agent, or Firm—Weinstein & Sutton

[57] ABSTRACT

A photometry controller is provided for a camera having an electronic flash controlling capability and capable of photometry of reflection from film surface. The controller is operative, whenever the difference in the brightness between a main subject and its background exceeds a given value, to delay the timing when the integration of a photocurrent is to be initiated by a given time interval after the initiation of an exposure triggered by a shutter release in an automatic manner, thus allowing the proportion of the integrated flashlight from the electronic flash relative to natural light to be increased.

11 Claims, 9 Drawing Figures

PHOTOMETRY CONTROLLER FOR CAMERA HAVING AN ELECTRONIC FLASH CONTROLLING CAPABILITY AND CAPABLE OF PHOTOMETRY OF REFLECTION FROM FILM SURFACE

BACKGROUND OF THE INVENTION

The invention relates to a photometry controller for a camera having an electronic flash controlling capability and capable of photometry based upon reflection of an image from a film surface, and more particularly, to a photometry controller for controlling a circuit within a camera having TTL (through-the-lens) automatic electronic flash controlling capability and capable of photometry based upon reflection of an image from a film surface, which circuit is used to integrate a photocurrent produced by a photoelectric transducer element.

The photometry employed with cameras can generally be categorized, according to the distributed sensitivity to light incidence, into average photometry, a centrally biased photometry (or average photometry with emphasis on the central region) and spotwise photometry. These techniques of photometry are advantageous in one aspect and disadvantageous in another. In particular, when taking a picture of a person in a rear lighting condition, against the background of the sea or snow covered mountain or the like, the main subject to be taken such as a person will be subject to an underexposure if the average or centrally biased photometry is utilized. If the spotwise photometry is utilized when taking such a picture, a substantially proper exposure will be achieved, but peripheral objects which define the background will be subject to excessive overexposure. In either instance, the picture as a whole will be a poorly balanced photograph. To accommodate for this, there has been proposed a technique (Japanese Laid-Open Patent Application No. 36,229/1978) in which photometric values according to the spotwise photometry and the centrally biased photometry are obtained, and whenever the difference therebetween exceeds a given value, a median value of them is derived to provide an exposure control. However, when a great difference prevails in the brightness level as when the main subject is under a very dark illumination as compared with the background, it is desirable to reduce the difference in the exposure given to the main subject and to the background in a positive manner by performing a so-called daylight synchronized photographing operation in which light from an electronic flash is directed toward the main object.

TTL automatic electronic flash may cooperate with a camera capable of photometry of reflection from a film surface to provide a so-called TTL centrally controlled electronic flash system. The system is designed to activate the electronic flash at the time when shutter blades are fully open, in order to compensate for any lack of exposure given by natural light. Accordingly, until the shutter blades become fully open, a photometric circuit of the system operates to integrate a photocurrent which results from the incidence of natural light, and to integrate a photocurrent which results from the flashlight from the electronic flash after the shutter blades are fully open. Accordingly, when taking a picture of an object which is in the rear light, while utilizing the TTL automatic electronic flash, the incidence of natural light of a high intensity which prevails in the background region may, after its photometry, prevent the electronic flash from being activated until the shutter blades are closed again or if the electronic flash is allowed to emit flashlight, the resulting time interval for integration of the flashlight from the electronic flash is greatly reduced as compared with the time interval over which natural light is integrated. Hence, this arrangement fails to provide a sufficient flashlight from the electronic flash for a subject which is in the rear light, to reduce a difference in the exposure given to the subject and to the background to trim the general tone of the picture field.

To cope with this problem, the present applicant has previously proposed a photometry control apparatus (see Japanese Laid-Open Patent Application No. 140,825/1980) in which the time when an integration is initiated in the photometric circuit is delayed until immediately before the time when the synchro contacts are closed to allow the emission of flashlight from an electronic flash, thus allowing the ratio of the integration of the flashlight from the electronic flash to the integration of natural light to be increased.

With the described apparatus, it is necessary to selectively operate a photographing operation in which the relative ratio of integration of the flashlight from the electronic flash is increased as contrasted to a normal photographing operation, in accordance with a visual determination of a difference in the brightness level between the subject and the background by the user. However, a visual determination of differential brightness each time a picture is to be taken when utilizing an electronic flash is troublesome. In addition, an accurate determination of the difference in the brightness requires a degree of skill, presenting a great difficulty.

SUMMARY OF THE INVENTION

In view of the foregoing, it is an object of the invention to provide a photometry controller for a camera having an electronic flash controlling capability and capable of photometry of reflection from a film surface in which whenever there occurs a difference in the brightness between a main subject to be taken and background which difference exceeds a given level, the time when the integration of a photocurrent is initiated is automatically delayed to a point which is a fixed time interval after the initiation of running of the first blind of a shutter, thus allowing the ratio of the integration of the flashlight from an electronic flash to be increased over the integration of natural light.

In accordance with the invention, when a difference in the brightness exceeds a given value between a specified area on an image field and another area which is peripheral thereto, the integration of a photocurrent from a photoelectric transducer element is initiated in delayed relationship with the initiation of running of the first blind of a shutter. Accordingly, if a picture is taken with TTL automatic electronic flash, the ratio of integration of the flashlight from an electronic flash to the integration of natural light is substantially increased, as compared with the ratio in a normal photographing operation utilizing an electronic flash which is intended to compensate for an insufficient exposure given by natural light. This eliminates the need for the user to determine a difference in the brightness, but if the difference in the brightness exceeds a given value, the emission interval of flashlight from the electronic flash is automatically increased to enable a desired photographing operation. Hence, a so-called TTL centrally controlled electronic flash system may be used to effect a daylight synchronized photographing operation of a subject which is in the rear light, as when on a fair day or against a snow mountain, in which a difference in the brightness is compensated for by the flashlight from the electronic flash. In this manner, the applicability of TTL automatic electronic flash photographing operation can be extended.

DESCRIPTION OF PREFERRED EMBODIMENTS

Figure 1:
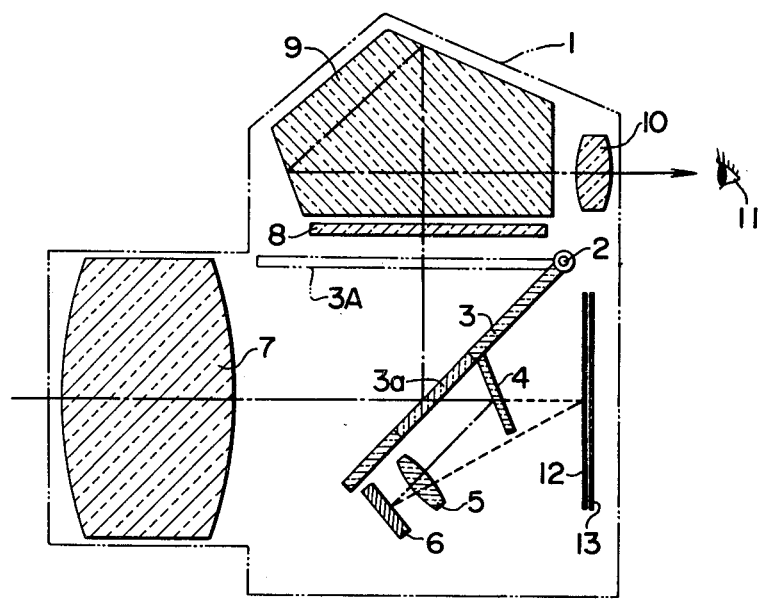
FIG. 1 is a schematic cross section of a camera capable of photometry of reflection from a film surface and incorporating a photometry controller according to the invention.

Referring to FIG. 1, there is shown a camera 1 including a mirror box (not shown) having an observation movable mirror 3 rotatably disposed on a support pin 2. On its rear side, the mirror 3 carries a photometry mirror 4 for cooperation with a collector lens 5 and a photometric or light receiving member 6, both of which are disposed below the mirror 3 and out of a taking light path. The light receiving surface of the photometric member 6 is disposed such that it is located opposite to both the reflecting surface of the mirror 4 and the front surface of the first blind 12 of a shutter, when the movable mirror 3 assumes its down or 45° position as shown. The movable mirror 3 includes a half mirror zone 3a, and light from an object being photographed which passes through a taking lens 7 and a diaphragm (not shown) partly transmits through the half mirror zone 3a for reflection by the mirror 4, whereupon it is directed through the collector lens 5 onto the light receiving surface of the photometric member 6. In this manner, light from an object being photographed is determined by the photometric member 6 before a shutter release takes place. Light from an object being photographed which is reflected by the movable mirror 3 is directed through a focussing glass 8, pentaprism 9, and eyepiece 10 to be incident on the eye 11 of a viewer. When a shutter release operation takes place to cause the movable mirror 3 to be resiliently driven to its position 3A shown in phantom line, the observation light path is closed while the taking light path is opened by the movable mirror 3. When the taking light path is opened, light from an object being photographed is focussed on the front surface of the first blind 12 of the shutter, which begins running, and the light is also focussed on the photosensitive surface of a film 13 which becomes exposed as the first blind 12 runs. The light focussed on the surface of the first blind 12 and the film surface 13 is reflected by the respective surfaces to be incident on the light receiving surface of the photometric member 6 through the collector lens 5, whereby the photometric member 6 continues its photometric operation of light from an object being photographed after the shutter release.

Figure 2:
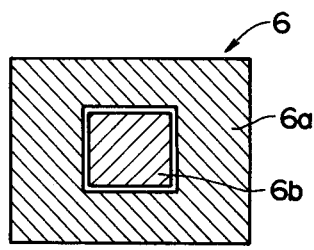
FIG. 2 is a plan view illustrating patterns on a light receiving surface of a photometric member shown in FIG. 1.

As shown in FIG. 2, the photometric member 6 comprises a pair of photoelectric transducer elements 6a, 6b having different areas to receive incident light. First transducer element 6a is provided to effect an average photometry with emphasis on the central region, and is formed so as to surround a second transducer element 6b which is centrally formed to exhibit a reduced area of square configuration and which provides the spotwise photometry. It is to be noted that the ratio of the area of the light receiving surfaces of the transducer elements 6a, 6b is an integer, for example 4:1. Hence, when the movable mirror 3 assumes its down position before the shutter release takes place, as shown in FIG. 1, the incidence of completely diffuse light, as light from an object being photographed and passing through the taking lens 7, causes the transducer elements 6a and 6b to produce photocurrents $I_{p1}$ and $I_{p2}$, which are related such that $4I_{p2} = I_{p1}$. Specifically, when completely diffuse light is incident on the entire light receiving surface of the photometric member 6 with no difference in the brightness level, the photocurrent $I_{p1}$ produced by the transducer element 6a which effects the average photometry with emphasis on the central region is chosen to be equal to four times the magnitude of the photocurrent $I_{p2}$ produced by the transducer element 6b which effects the spotwise photometry. Accordingly, when the brightness of the central region of the image field, which is measured by the transducer element 6b, is by 1 EV lower in brightness than the marginal region of the image field, which is determined by the transducer element 6a, the photocurrents $I_{p1}$, $I_{p2}$ are related such that $8I_{p2} = I_{p1}$.

In embodiments of the invention to be described below, an arrangement is made to switch the time when the integration of a photocurrent is to be initiated on the basis that a difference in the brightness between the light receiving surface of the first transducer element 6a and the light receiving surface of the second transducer element 6b is equal to 1 EV during a daylight synchronized photographing operation effected with TTL automatic electronic flash. It is the first transducer element 6a of the photometric member 6 which determines the exposure of the film surface by receiving reflected light from the surface of the first blind and film surface, and consequently the integration of the photocurrent $I_{p1}$ produced by the transducer element 6a is controlled.

Figure 3:
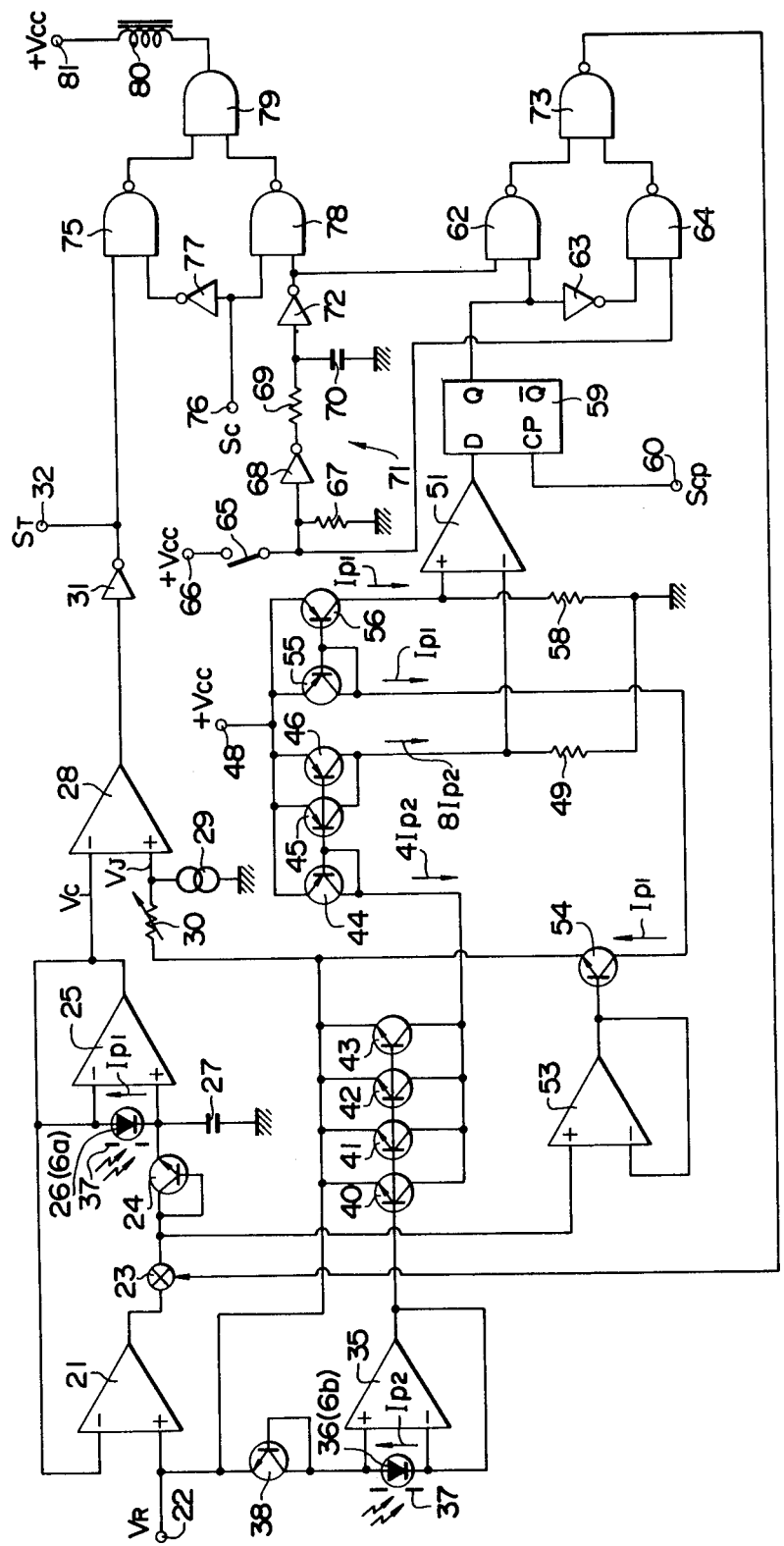
FIG. 3 is a circuit diagram of a photometry controller according to one embodiment of the invention.

FIG. 3 is a circuit diagram of a photometry controller according to one embodiment of the invention. An operational amplifier 21 has its non-inverting input terminal connected to a terminal 22, to which a reference voltage $V_R$ is applied. The output terminal of the amplifier 21 is connected through an analog switch 23 to the base and the collector of an NPN transistor 24 which provides a logarithmic compression. The emitter of the transistor 24 is connected to the non-inverting input terminal of an integrating, operational amplifier 25, which has a photoelectric transducer element 26 connected across its inverting and non-inverting input terminals. The anode of the element 26 is connected to the inverting input terminal, and the transducer element 26 effects an average photometry with emphasis on the central region and corresponds to the first transducer element 6a shown in FIG. 2. An integrating capacitor 27 is connected between the non-inverting input terminal of the amplifier 25 and the ground. The output terminal of the amplifier 25 is connected to the inverting input terminal thereof as well as to the inverting input terminal of the amplifier 21, and is also connected to the inverting input terminal of a following comparator, operational amplifier 28. The non-inverting input terminal of the amplifier 28 is connected to the ground through a constant current source 29, and is also connected through a variable resistor 30, which is utilized to preset film speed, to the terminal 22. The output terminal of the amplifier 28 is connected through an inverter 31 to a terminal 32, where an emission terminate signal ST is developed for transmission to an associated electronic flash.

A photoelectric transducer element 36 effecting a spotwise photometry of the central region of the image field is connected across the inverting and the non-inverting input terminal of an operational amplifier 35, with the anode of the element 36 connected to the non-inverting input terminal. The transducer element 36 corresponds to the second transducer element 6b shown in FIG. 2. It is to be understood that light from an object being photographed which passes through an actual diaphragm 37 is incident on the respective transducer elements 36, 26. The inverting input terminal of the amplifier 35 is connected to an output terminal thereof while the non-inverting input terminal is connected to the base and the collector of an NPN transistor 38 which provides a logarithmic compression. The emitter of the transistor 38 is connected to the terminal 22. The output terminal of the amplifier 35 is connected to the bases of four NPN transistors 40 to 43, which exhibit an identical characteristic with the transistor 38. The emitters of the transistors 40 to 43 are connected in common to the terminal 22. The collectors of the transistors 40 to 43 are connected in common and connected to the base and collector of an NPN transistor 44, which has its base connected to the bases of PNP transistors 45, 46 which exhibit an identical characteristic with the transistor 44. The emitters of the transistors 44 to 46 are connected in common and connected to a terminal 48, to which a supply voltage +Vcc is applied. The collectors of the transistors 45, 46 are connected in common and connected to the ground through a resistor 49. The junction between the transistors 45, 46 and the resistor 49 is connected to the inverting input terminal of an operational amplifier 51, which functions as a comparator.

The junction between the analog switch 23 and the transistor 24 is connected to the non-inverting input terminal of an operational amplifier 53, the inverting input terminal of which is connected to an output terminal thereof. The output terminal of the amplifier 53 is connected to the base of an NPN transistor 54 which exhibits an identical characteristic with the transistor 24. The emitter of the transistor 54 is connected to the terminal 22 while its collector is connected to the base and collector of PNP transistor 55, the base of which is in turn connected to the base of another PNP transistor 56 which exhibits an identical characteristic with the transistor 55. The emitters of the transistors 55, 56 are connected to the terminal 48, and the collector of the transistor 56 is connected to the ground through a resistor 58. The junction between the transistor 56 and resistor 58 is connected to the non-inverting input terminal of the amplifier 51.

The output terminal of the amplifier 51 is connected to a D input terminal of D-type flipflop 59, which forms a brightness difference decision circuit together with the amplifier 51. The flipflop 59 includes a clock input terminal CP, which is connected to a terminal 60, to which a clock pulse Scp is applied upon shutter release. The output terminal Q of the flipflop is connected to one input of NAND gate 62 and also connected to one input terminal of NAND gate 64 through an inverter 63. The other input terminal of gate 64 is selectively connected to a terminal 66, to which the supply voltage +Vcc is applied, through a trigger switch 65 which is operated in interlocked relationship with the movement of the first blind 12 of the shutter. The trigger switch 65 is closed when the first blind is being wound up, and is opened when the first blind begins to run. The terminal of the trigger switch 65 remote from the terminal 66 is connected to the ground through a resistor 67, and is also connected to an inverter 68, the output terminal of which is in turn connected to an inverter 72 through a delay circuit 71 including a resistor 69 and capacitor 70. Representing the resistance of resistor 69 by $R_2$ and the capacitance of capacitor 70 by $C_2$, these parameters are chosen to define a time constant $C_2R_2$ such that the delay circuit 71 has a delay time T which is equal to the time required for the first blind of the shutter to complete its running since it has started running. The output terminal of the inverter 72 is connected to the other input terminal of the gate 62. The output terminal of the gate 62 is connected to one input terminal of NAND gate 73, the other input terminal of which is connected to the output terminal of the gate 64. The output terminal of the gate 73 is connected to a control terminal of the analog switch 23.

The output from the inverter 31 is connected to one input terminal of NAND gate 75, the other input terminal of which is connected, through an inverter 77, to a terminal 76, to which a charging complete signal Sc is applied from an associated electronic flash whenever the electronic flash is ready to emit flashlight. The terminal 76 is also connected to one input terminal of NAND gate 78, the other input terminal of which is connected to the output terminal of the inverter 72. The output terminal of the gate 75 is connected to one input terminal of AND gate 79, the other output terminal of which is connected to the output terminal of the gate 78. The output terminal of the gate 79 is connected to a terminal 81, to which the supply voltage +Vcc is applied, through an electromagnet 80 which functions to constrain the second blind (not shown) of the shutter from running.

In operation, when the TTL automatic electronic flash is connected to the camera including the photometry controller mentioned above and the power switch is turned on, the supply voltage +Vcc is applied to the terminals 48, 66 and 81 shown in FIG. 3, and the reference voltage VR is applied to the terminal 22. When the electronic flash is ready to emit flashlight, the charging complete signal Sc is applied to the terminal 76 from the electronic flash. When the camera is directed to an object being photographed, light from an object being photographed and passing through the taking lens 7 and reflected by the mirror 4, as shown in FIGS. 1 and 2, is incident on the transducer elements 26 (6a), 36 (6b), whereby these transducer elements produce photocurrents $I_{p1}$, $I_{p2}$ in accordance with the amount of light which their respective light receiving regions have received.

When the shutter blind has been wound up, the trigger switch 65 is closed. No clock pulse Scp is applied to the clock input terminal CP of the D-type flipflop 59, and hence its output terminal Q assumes a low level (hereafter referred to as "L" level), so that both inputs to the gate 64 are at a high level (hereafter referred to as "H" level), causing the gate 64 to produce an output of "L" level. Accordingly, the gate 73 produces an output of "H" level, which is effective to close the analog switch 23. This allows the reference voltage VR to be fed from the output terminal of the amplifier 21 through the analog switch 23 and the transistor 24 to the non-inverting input terminal of the amplifier 25, thus allowing the capacitor 27 to be charged to a level which corresponds to the reference voltage VR.

However, when the transducer element 26 produces the photocurrent $Ip_1$, the current $Ip_1$ flows through the transistor 24 in a direction from its collector to its emitter. Since the emitter potential of the transistor 24 is equal to the potential at the output terminal of the amplifier 25, which is in turn equal to the reference voltage VR, it will be seen that the emitter potential of the transistor 24 is equal to the emitter potential of the transistor 54. Because of the amplifier 53, the base potential of the transistor 24 is equal to the base potential of the transistor 54. Thus, the base-to-emitter voltage of the transistor 54 is equal to the base-to-emitter voltage of the transistor 24, whereby a collector current equal to the photocurrent $Ip_1$ flows through the transistor 54. The flow of the collector current $Ip_1$ through the transistor 54 causes the current $Ip_1$ to flow from the emitter to the collector of the transistor 55, and the current mirror effect causes the current $Ip_1$ also to flow through the collector of the transistor 56. Hence, representing the resistance of resistor 58 by $R_1$, there is developed a voltage $Ip_1 \cdot R_1$ across resistor 58, which voltage is applied to the non-inverting input terminal of the amplifier 51.

When the photocurrent $Ip_2$ is produced by the transducer element 36, the current $Ip_2$ flows through the transistor 38 in a direction from its collector to its emitter. The base potential of the transistor 38 is equal to the potential at the output terminal of the amplifier 35 while the emitter potential of the transistor 38 is equal to the common emitter potential of the transistors 40 to 43. Accordingly, the base-to-emitter voltage of the transistors 40 to 43 is equal to the base-to-emitter voltage of the transistor 38, and thus a collector current equal to the photocurrent $Ip_2$ flows through each of the transistors 40 to 43. When the current $Ip_2$ flows through each of the four transistors 40 to 43, it follows that a current which is four times the current $Ip_2$ flows through the transistor 44 from its emitter to its collector. The flow of the current $4Ip_2$ through the transistor 44 causes the current $4Ip_2$ to flow through each of the transistors 45, 46 by the current mirror effect, whereby a current equal to $8Ip_2$ flows through the resistor 49. Since the resistor 49 has a resistance which is equal to the resistance $R_1$ of the resistor 58, there is developed a voltage $8Ip_2 \cdot R_1$ thereacross, which is applied to the inverting input terminal of the amplifier 51. It is to be understood that the resistors 49, 58 may be replaced by forwardly-poled diodes having an identical characteristic.

Where a small difference in the brightness prevails between the central region of the image field where the transducer element 36 intended for spotwise photometry is disposed, and the marginal region where the transducer element 26, intended for the average photometry with emphasis on the central region, is disposed, or stated differently, where the brightness of the main subject to be taken which is located on the central region of the image field is lower than but within 1 EV of the brightness of the background, the photocurrents $Ip_1$ and $Ip_2$ are related such that $Ip_1 < 8Ip_2$. Hence, the output of the amplifier 51 is an "L" level. However, when the brightness of the main subject to be taken, disposed on the central region of the image field where the transducer element 36 is disposed, is lower than the brightness of the background region of the image field where the transducer element 26 is disposed, by an amount equal to or greater than 1 EV, the photocurrents $Ip_1$ and $Ip_2$ are related such that $Ip_1 \geqq 8Ip_2$. The output of the amplifier 51 then reverts to an "H" level. The output level of the amplifier 51 thus depends on the magnitude of the difference in the brightness between the central region and the marginal region of the image field. The operation which occurs subsequent to shutter release will now be described with reference to the timing charts shown in FIGS. 4A and 4B, which illustrate the operations when the difference is high and low.

Figure 4A:
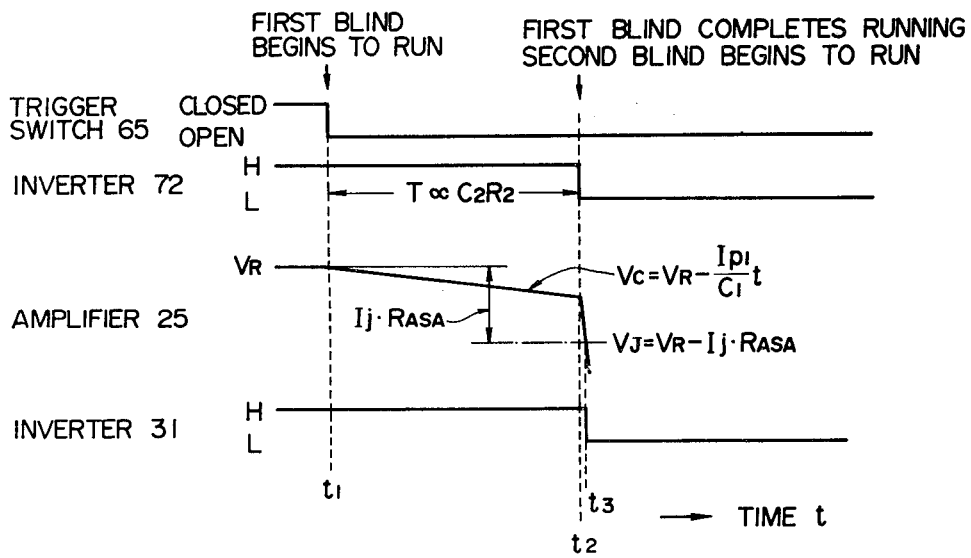
FIGS. 4A and 4B each show a series of timing diagrams illustrating the operation of the photometry controller shown in FIG. 3.

(1) When the difference in the brightness is small and photocurrents are related such that $Ip_1 < 8Ip_2$, the amplifier 51 in the brightness difference decision circuit produces an output of "L" level. Accordingly, upon shutter release which allows the application of the clock pulse Scp to the clock input terminal CP of the D-type flipflop 59, the Q output remains at its "L" level, which feeds "H" to one input of the gate 64. As the first blind 12 of the shutter begins running, thr trigger switch 65 is opened at time t1, changing the other input to the gate 64 from "H" to "L", whereby the output level of the gate 64 changes from "L" to "H". The gate 62 has its one input which receives an "L" output level from the flipflop 59, and hence its output level is "H". Accordingly, as the output level of the gate 64 changes from "L" to "H", the output of the gate 73 changes from "H" to "L" level, opening the analog switch 23. Thus, the analog switch 23 is opened in response to the opening of the trigger switch 65 at time t1 when the first blind of the shutter begins to run. As the analog switch 23 is opened, the charging path for the integrating capacitor 27 is interrupted, and the charge thereon discharges at a rate determined by the photocurrent $Ip_1$. Representing the capacitance of the capacitor 27 by $C_1$, the integrated voltage, or the output voltage Vc from the amplifier 25, changes with a slope defined by the equation $Vc = VR - (Ip_1/C_1)(t)$, as indicated in FIG. 4A. The output voltage Vc of the amplifier 25 is compared against a decision voltage VJ by the amplifier 28. Representing the resistance of the variable resistor 30, which is used to preset film speed, by $R_{ASA}$ and the constant current flow through the source 29 by Ij, the decision voltage VJ is given by the equation $VJ = VR - Ij \cdot R_{ASA}$. So long as the voltage Vc is higher than the decision voltage VJ, the amplifier 28 produces an output of "L" level, so that the output of the inverter 31 or the signal level fed to the terminal 32 and to one input of the gate 75 is "H". If the charging complete signal Sc of "H" level is supplied to the terminal 76 from the associated electronic flash, the gate 75 produces an output of "H" level. The inverter 72 produces an output of "H" level when the trigger switch 65 is closed, but as mentioned previously, since the delay time T of the delay circuit 71 is chosen so as to be coincident with the time required for the first blind of the shutter to complete its running since it has begun running, the output of the inverter 72 remains at its "H" level, as shown in FIG. 4A so long as the first blind continues running. Accordingly, the gate 78 produces an output of "L" level, whereby the gate 79 produces an output of "L" level, allowing the electromagnet 80 to be energized to constrain the second blind of the shutter from running.

Under normal photographing operations utilizing the TTL automatic electronic flash, the subject to be taken is under low illumination and the photocurrent $Ip_1$ has a minimal magnitude, so that the output of the amplifier 28 remains at its "L" level at time t2 when the first blind has completed running and the shutter is fully open. At time t2, synchro contacts, not shown, are closed to feed an emit signal to the associated electronic flash, which therefore emits the flashlight. When the electronic flash is activated to irradiate the subject to be taken, and the illumination is reflected by the film surface to be incident on the transducer element 26, the magnitude of the photocurrent $Ip_1$ increases rapidly and hence the slope of the output voltage Vc from the amplifier 25 changes to a steep one from time t2 on. As indicated in FIG. 4A, the output of the inverter 72 changes to "L" level at time t2. The output of the gate 78 then changes to its "H" level, whereby the output of the gate 79 changes to its "H" level, deenergizing the electromagnet 80 to release the second blind from constraint. When the second blind of the shutter is released and begins running, the flashlight from the electronic flash is integrated while the shutter is fully open across the image field. The flashlight compensates for the lack of illumination provided by natural light, and when a proper exposure has been given to the film surface, the output voltage Vc of the amplifier 25 reaches the level of the decision voltage VJ at time t3 where Vc≦VJ or $(Ip_1/C_1)t ≧ Ij·R_{ASA}$, whereupon the output of the amplifier 28 changes to its "H" level, changing the terminal 32 to "L" level which represents an emission terminate signal ST fed to the electronic flash to cease its emission of flashlight.

Figure 4B:
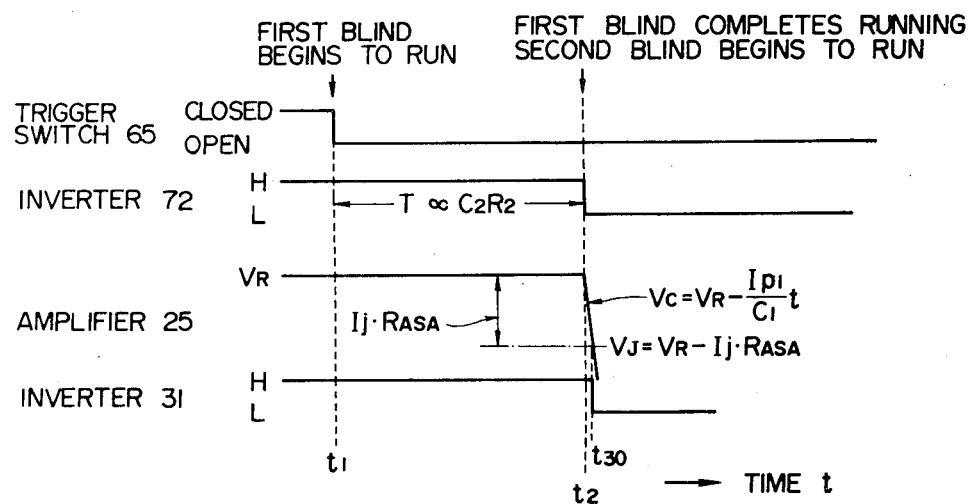

(2) When the difference in the brightness between the central and marginal region of the image field is high and the photocurrents are related such that $Ip_1 ≧ 8Ip_2$, the amplifier 51 of the brightness level decision circuit produces an output of "H" level, so that the Q output of the flipflop 59 changes to its "H" level at the same time as the shutter release takes place, producing a decision signal. This feeds the "H" level to one input of the gate 62 and "L" level to one input of the gate 64. Accordingly, the output of the gate 64 assumes the "H" level regardless of condition of the trigger switch 65 because the output of the inverter 72 is at its "H" level when the shutter release takes place to open the trigger switch 65, by virtue of the delay circuit 71. As indicated in FIG. 4B, the output of the gate 62 changes to its "L" level at the same time as the output of the flipflop 59 changes to its "H" level. Accordingly, the output of the gate 73 remains at its "H" level after the shutter release. Specifically, as the shutter release allows the first blind 12 to begin running to thereby increasingly expose more of the film surface, the analog switch 23 remains closed, so that the terminal voltage of the capacitor 27 is maintained at the value of the reference voltage VR, preventing an integrating operation of the photocurrent $Ip_1$. Such condition is maintained until the first blind 12 completes running. If the film surface is exposed by natural light during such time interval, no integration is made of the resulting photocurrent $Ip_1$. Accordingly, the output voltage Vc of the amplifier 25 is equal to the reference voltage VR, as shown in FIG. 4B, until time t2 when the first blind 12 completes running.

At time t2 when the shutter blinds are fully open at the completion of running of the first blind 12, the synchro contacts are closed to feed an emit signal to the associated electronic flash, activating it for emission of flashlight. The flashlight from the electronic flash irradiates the subject to be taken, and is then reflected by the film surface to be incident on the transducer element 26, whereupon the magnitude of the photocurrent $Ip_1$ increases rapidly. Also at time t2, the output of the inverter 72 changes to its "L" level, so that the output of the gate 62 changes to its "H" level, causing the gate 73 to produce an output of "L" level. This opens the analog switch 23, whereby the charging path for the capacitor 27 is interrupted, allowing the charge on the capacitor 27 to be discharged in accordance with the magnitude on the photocurrent $Ip_1$ from time t2, thus initiating an integrating operation. When the output of the inverter 72 changes to its "L" level at time t2, the output of the gate 78 changes to its "H" level, whereby the output of the gate 79 changes to its "H" level to deenergize the electromagnet 80, releasing the second blind of the shutter and allowing it to begin running in order to terminate an exposure. As the second blind begins running, the integration of the photocurrent $Ip_1$ continues so long as the shutter blades are still fully open. As indicated in FIG. 4B, the output voltage Vc of the amplifier 25 changes very rapidly or steeply from time t2 on. Since no integration of natural light takes place during the interval from time t1 to time t2, it will be seen that it takes a little longer time for the integration which commences at time t2, as compared with the previous case. In the previous case when the integration is initiated at time t1, the emission of the flashlight is interrupted at time t3 when Vc≦VJ. However, the initiation of the integration from time t2 on causes the output voltage Vc of the amplifier 25 to reach the decision level VJ at time t30 which is slightly lagging behind the time t3. At such time, the output of the amplifier 28 changes to its "H" level, and the output of the inverter 31 changes to its "L" level, feeding the emission interrupt signal ST to the associated electronic flash from the terminal 32 to cease the emission of flashlight therefrom. It will be thus seen that during this photographing operation, the proportion of the flashlight from the electronic flash relative to natural light is increased. The flashlight acts to irradiate the main subject being photographed and having a brightness which is by 1 EV or greater lower than that of the background, thereby reducing the difference in the amount of exposure given to the main subject and the background.

Figure 5:
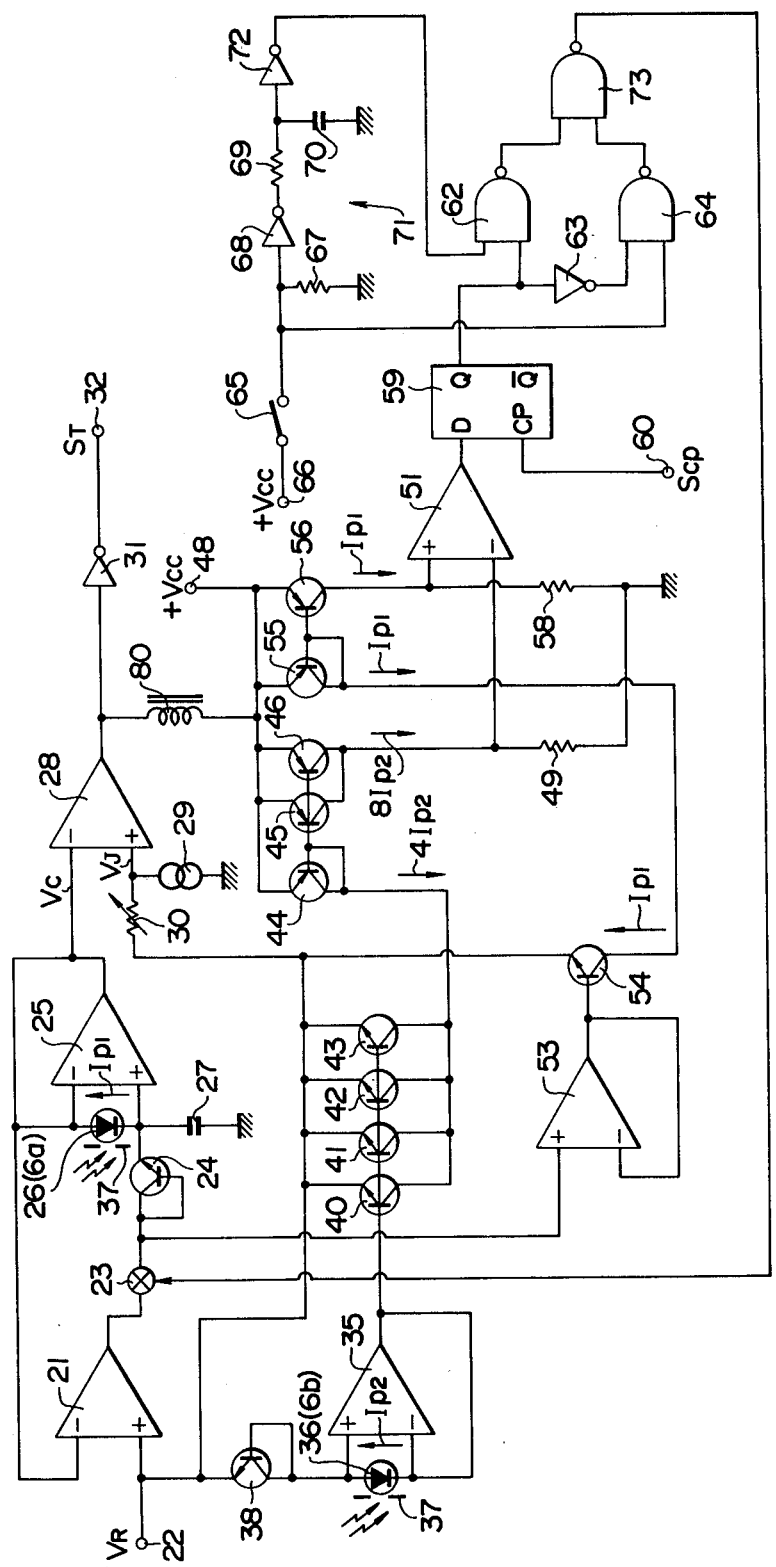
FIG. 5 is a circuit diagram of a photometry controller according to another embodiment of the invention.

In the described embodiment, the time when the running of the second blind of shutter is initiated is fixed by the delay circuit 71, but it is also possible that the running of the second blind be initiated in synchronized relationship with the delivery of the emission interrupt signal fed to the electronic flash. FIG. 5 is a circuit diagram of a photometry controller according to another embodiment of the invention which incorporates the arrangement mentioned just above. It is to be understood that in FIG. 5, similar parts as shown in FIG. 3 are designated by like numerals and characters in FIG. 5 without repeating their description. In the photometry controller shown in FIG. 5, the electromagnet 80 which serves to constrain the second blind from running is connected between output terminal of the amplifier 28 and the terminal 48, to which the supply voltage +Vcc is applied. Accordingly, the inverter 77, NAND gates 75, 78 and AND gate 79 are eliminated. In this embodiment, the output level of the amplifier 51 in the brightness difference decision circuit is automatically switched in accordance with a difference in the brightness between the central and the peripheral region of the image field as before, and the operation which occurs upon and after shutter release will now be described with reference to series of timing charts shown in FIGS. 6A to 6C.

Figure 6A:
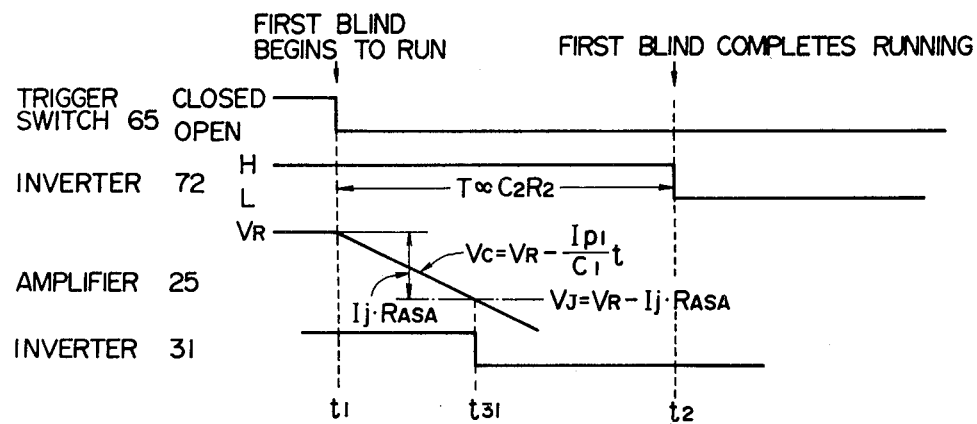
FIGS. 6A, 6B and 6C each show a series of timing diagrams illustrating the operation of the photometry controller shown in FIG. 5.

(1) When a difference in the brightness between the central and the peripheral region of the image field is low and the photocurrents are related such that $Ip_1 < 8Ip_2$, the amplifier 51 of the brightness difference decision circuit produces an output of "L" level, and hence the Q output of the flipflop 59 remains at its "L" level if the shutter release takes place. When the first blind 12 of the shutter begins running in response to the shutter release and closes the trigger switch 65 at time t1, the output of the gate 73 changes from its "H" to its "L" level, whereby the analog switch 23 is opened. The opening of the switch 23 allows the capacitor 27 to begin discharging in accordance with the photocurrent $Ip_1$ produced by the transducer element 26, thus initiating an integrating operation. When natural light has a high brightness level, the photocurrent $Ip_1$ has an increased magnitude, so that the output voltage Vc of the amplifier 25 decreases relatively rapidly as shown in FIG. 6A, and reaches the decision voltage VJ before the first blind completes its running. At time t31 where $Vc \leq VJ$ or $(Ip_1/C_1) > Ij \cdot R_{ASA}$, the output of the amplifier 28 changes to its "H" level, whereby the electromagnet 80 is deenergized, allowing the second blind to begin running. Since the first blind completes its running at time t2 which is after the second blind has started running, the electronic flash is not activated, and the film is only exposed to natural light to terminate its exposure.

Figure 6B:
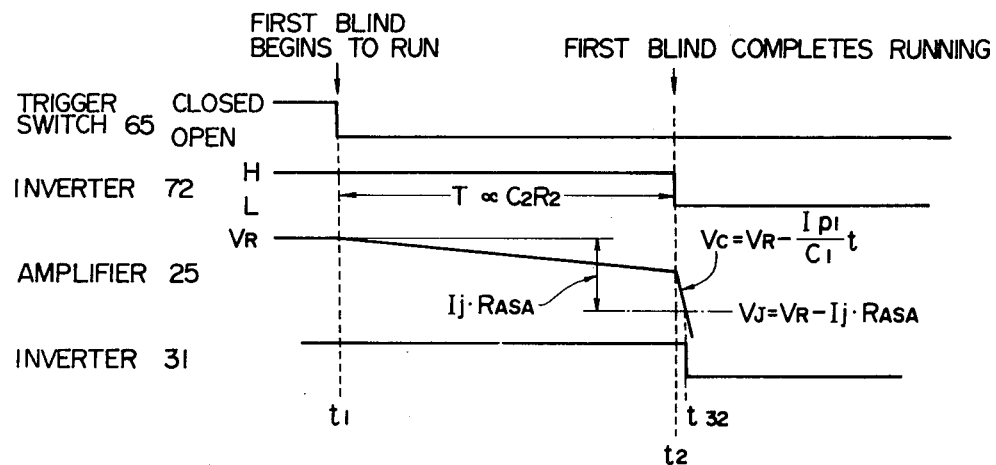

Under situations where natural light alone is insufficient to provide a proper exposure, the magnitude of the photocurrent $Ip_1$ is low, and hence the output voltage Vc of the amplifier 25 decreases with a relatively gentle slope as indicated in FIG. 6B. The photocurrent $Ip_1$ resulting from natural light, but at time t2 when the first blind completes its running and the shutter is fully open, the output voltage Vc of the amplifier 25 does not yet reach the decision voltage VJ, so that the output of the amplifier 28 assumes its "L" level. When the shutter is fully open at time t2, the synchro contacts are closed to feed an emit signal to the associated electronic flash to activate it, whereupon the flashlight from the electronic flash irradiates the subject to thereby increase the photocurrent $Ip_1$ rapidly. Hence, the output voltage Vc of the amplifier 25 then decreases steeply and attains $Vc \leq VJ$ at time t32. At time t32, the output of the amplifier 28 changes to its "H" level, so that the electromagnet 80 is deenergized to allow the second blind to begin running. Simultaneously, the inverter 31 feeds the emission terminate signal to the electronic flash through terminal 32, thus terminating an exposure. Thus, the emission of flashlight from the electronic flash is just sufficient to compensate for the lack of exposure provided by natural light alone as it is integrated.

(2) When a difference in the brightness between the central and the marginal region of the image field is high and the photocurrents are related such that $Ip_1 \geq 8Ip_2$, the output of the amplifier 51 assumes "H" level in distinction to that mentioned in the preceding paragraph, so that the Q output of the flipflop 59 changes to "H" level at the same time as the shutter release takes place, producing a decision signal. The output of the gate 64 also changes to "H" level. Because the output of the inverter 72 assumes an "H" level if the trigger switch 65 is opened at time t1 when the shutter release takes place, by virtue of the delay circuit 71, the gate 62 produces an output of "L" level. Accordingly, the output of the gate 73 remains at its "H" level even after the shutter release, in the same manner as in the previous embodiment, and hence the analog switch 23 is not closed at time t1, but is maintained open. In other words, when the first blind begins running at time t1 to begin exposing the film surface, the resulting photocurrent $Ip_1$ which is produced in response to the incidence of reflected natural light is not integrated. Such condition continues until time t2 when the running of the first blind is completed. Accordingly, the output voltage Vc of the amplifier 25 is maintained equal to the reference voltage VR from time t1 to time t2, as before, maintaining a potential difference of $Ij \cdot R_{ASA}$ with respect to the decision voltage VJ.

Figure 6C:
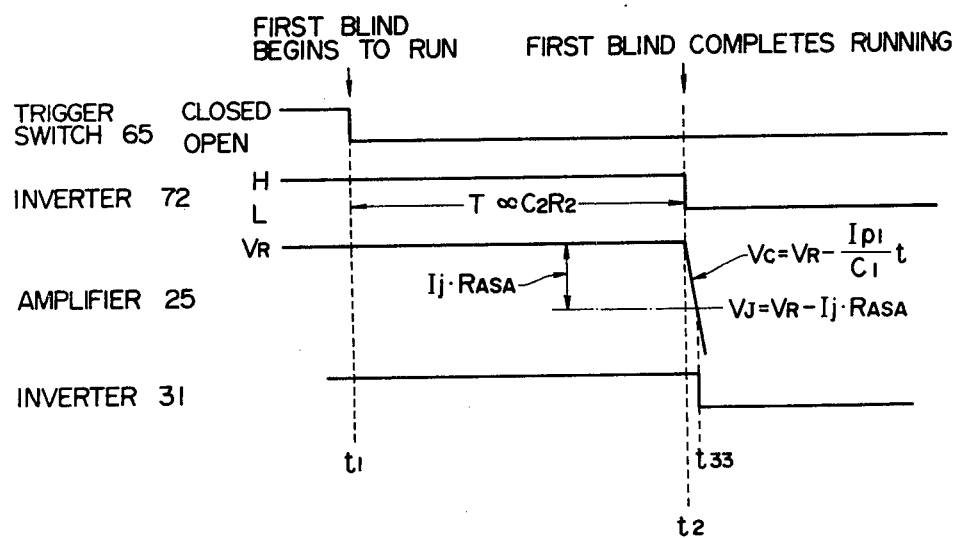

When the shutter is fully open at time t2, the synchro contacts are closed to activate the electronic flash, which emits flashlight directed to the subject. The flashlight is subsequently reflected by the film surface to be incident on the transducer element 26, whereby the photocurrent $Ip_1$ increases rapidly. At time t2, the output of the inverter 72 changes to its "L" level, whereby the output of the gate 62 changes to its "H" level and the output of the gate 73 changes to its "L" level, opening the analog switch 23. Accordingly, the capacitor 27 begins to discharge in accordance with the photocurrent $Ip_1$ from time t2 on. Since the integration of the photocurrent $Ip_1$ produced by the transducer element 26 which receives the flashlight from the electronic flash from time t2 when the shutter is fully open is initiated, the output voltage Vc of the amplifier 25 decreases steeply from time t2 on, as shown in FIG. 6C. When the output voltage Vc reaches the decision voltage VJ or $Vc \leq VJ$ at time t33, the output of the amplifier 28 changes to its "H" level and the output of the inverter 31 changes to its "L" level, thus feeding the emission terminate signal ST to the associated electronic flash through the terminal 32 and simultaneously deenergizing the electromagnet 80 to allow the second blind to run. In this manner, the emission of flashlight from the electronic flash is terminated as is the exposure. It will be seen that the integrating period from time t2 to time t33 is longer than the integrating time required during the operation mentioned under the paragraph (1), by an amount which corresponds to an integral obtained by integrating natural light from time t1 to time t2. Stated differently, if the integration is initiated at time t1, the emission of the flashlight will be ceased at time t32 shown in FIG. 6B. However, in the present instance, the output voltage Vc reaches the decision voltage VJ or $Vc \leq VJ$ at time t33 which is slightly lagging behind time t32, then feeding the emission terminate signal ST to the electronic flash and simultaneously allowing the second blind to run. Accordingly, a main subject to be taken which is of a lower brightness than the background by 1 EV or greater, such as one which is in the rear light, can be sufficiently illuminated to reduce a difference in the amount of exposure given to the main subject and the background region of the film surface, permitting a photograph to be formed which is well balanced in respect of the brightness.

In the embodiments shown in FIGS. 3 and 5, the timing of initiating the integration when there is a large difference in the brightness between the central and marginal region of the image field is chosen to be coincident with time t2 when the first blind of the shutter completes its running so that the photometry is initiated at the same time as the emission of flashlight from the electronic flash. However, in carrying out the invention, it is not essential that the timing of initiating the integration be coincident with the point in time when the running of the first blind is completed. By way of example, the integration may be initiated anywhere between time t1 when the first blind begins running and time t2 when it completes its running. In this instance, the integration of natural light occurs in delayed relationship to time t1 when the first blind begins to run, and subsequently at time t2 when the first blind completes its running, the electronic flash is activated to emit flashlight. Again the proportion of flashlight from the electronic flash relative to natural light can be increased, as compared with the case where the integration is initiated at time t1. A suitable timing can be chosen for the initiation of the integration with a desired time delay with respect to time t1, by suitably choosing the time constant $C_2R_2$ of the delay circuit 71. In such instance, the electromagnet 80 which constrains the second blind can be controlled by separate delay means for the embodiments shown in FIG. 3.

In the above description, it is assumed that timing of initiating the integration is delayed if the brightness of the central region of the image field is by 1 EV or greater lower than that of the marginal area. However, such threshold is not limited thereto, but any desired value may be chosen, and it is also a simple matter to provide a variable threshold. It is also contemplated that for certain subjects to be taken, the brightness of the central region may be higher than the brightness of the marginal region of the image field. In this instance, an arrangement may be made to delay the timing of initiating the integration so that a proper exposure of the peripheral region is assured.

What is claimed is:

1. A photometry controller for a camera having an electronic flash controlling capability and capable of photometry of reflection from film surface, comprising:
    a photometric assembly disposed within a camera which is adapted for TTL direct photometry and including a first photoelectric transducer element designed for average photometry with emphasis on a central region of an image field and a second photoelectric transducer element designed for spotwise photometry, both the first and the second transducer elements receiving light from an object being photographed which passes through a taking lens;
    a photocurrent integrator for integrating a photocurrent produced by one of the transducer elements;
    a brightness difference decision circuit responsive to output photocurrents from said first and second transducer elements to compare the brightness of a particular region of an image field and the brightness of its marginal region against each other and to produce a brightness difference signal whenever they assume a given relative value;
    a gating circuit responsive to the brightness difference signal including a delay circuit for delaying the timing when the integration of the photocurrent by the integrator is initiated by a given time interval from the initiation of exposure triggered by a shutter release of the camera;
    and a comparison circuit responsive to said integrator for producing an emission terminate signal for operating an associated electronic flash whenever the integrated output voltage from the integrator reaches a preset decision voltage of the camera,
    thereby permitting the proportion of the integrated flashlight from the electronic flash relative to the integrated natural light to be increased.

2. A photometry controller according to claim 1 in which the photometric assembly is disposed within the camera at a position which is outside a taking light path, and has a light receiving surface, which is shaped so as to correspond to an image field and which is disposed so as to receive reflected light from a movable photometry mirror, the surface of a shutter blind and a film surface and wherein the first and the second transducer element have areas of light receiving surface which are in the ratio of an integer.

3. A photometry controller according to claim 1 in which the brightness difference decision circuit comprises a current mirror circuit which multiplies a photocurrent produced by one of the transducer elements by a given factor which depends on the preset brightness difference between the particular region and the peripheral region of the image field, an operational amplifier for comparing the multiplied photocurrent against the photocurrent produced by the other transducer element, and a D-type flipflop for producing output signals of different levels in response to an output from the operational amplifier.

4. A photometry controller according to claim 1 in which the preset brightness difference is chosen to be 1 EV in terms of an exposure factor.

5. A photometry controller according to claim 1 in which the delay circuit comprises a resistor and a capacitor.

6. A photometry controller according to claim 1 in which the given time interval of the delay circuit is chosen to be coincident with the time required for the first blind of a shutter to complete its running once it has started running.

7. A photometry controller according to claim 1 including means for adjusting the decision voltage so that its value depends on the film speed of the film being used.

8. A photometry controller according to claim 1 including means for allowing the second blind of a shutter to begin running responsive to and in synchronized relationship with the delivery of the emission terminate signal fed to the electronic flash.

9. A photometry circuit according to claim 1 wherein said gating circuit includes means bypassing said delay circuit to initiate said integrator upon shutter release of the camera.

10. A photometry controller for a camera having an electronic flash controlling capability and capable of photometry of an image reflected from a film surface, comprising:
    a first photoelectric transducer element for average photometry with emphasis on the central region of an image field;

a second photoelectric transducer element for spotwise photometry of the image field;

said first and second transducer elements being positioned to receive light from an object being photographed which passes through the taking lens of the camera;

a normally disabled photocurrent integrator for integrating a photocurrent developed by at least one of said transducer elements;

a brightness difference measuring circuit responsive to the outputs of said first and second transducer elements for producing a brightness difference signal whenever the values of the outputs of said first and second transducer elements differ by a predetermined amount;

delay means triggered by initiation of a photographing operation for generating a delayed trigger signal;

a gating circuit responsive to said trigger signal and said brightness difference signal for enabling said integrator to begin an integration of the photocurrent signal applied thereto; and comparison means for producing an emission terminate signal for extinguishing an associated electronic flash when the integrator output reaches predetermined level to thereby increase the interval over which the flashlight acts upon the integrator.

11. A photometry circuit according to claim 10 wherein said gating circuit includes means for enabling said integrator upon initiation of the triggering signal in the absence of said brightness difference signal.

* * * * *

UNITED STATES PATENT AND TRADEMARK OFFICE
CERTIFICATE OF CORRECTION

PATENT NO. : 4,456,353
DATED : June 26, 1984
INVENTOR(S) : Kazunori Mizokami

It is certified that error appears in the above-identified patent and that said Letters Patent is hereby corrected as shown below:

Column 8:

Line 31, change "thr" to --the--.

Column 11:

Line 13, delete the word "the" (first occurrence).

Signed and Sealed this

Twenty-third Day of October 1984

[SEAL]

Attest:

Attesting Officer

GERALD J. MOSSINGHOFF

Commissioner of Patents and Trademarks